Oct. 6, 1942.  W. C. REA  2,297,983
METHOD OF MAKING DETACHABLE BITS FOR ROCK DRILLS
Filed March 9, 1939  4 Sheets-Sheet 2
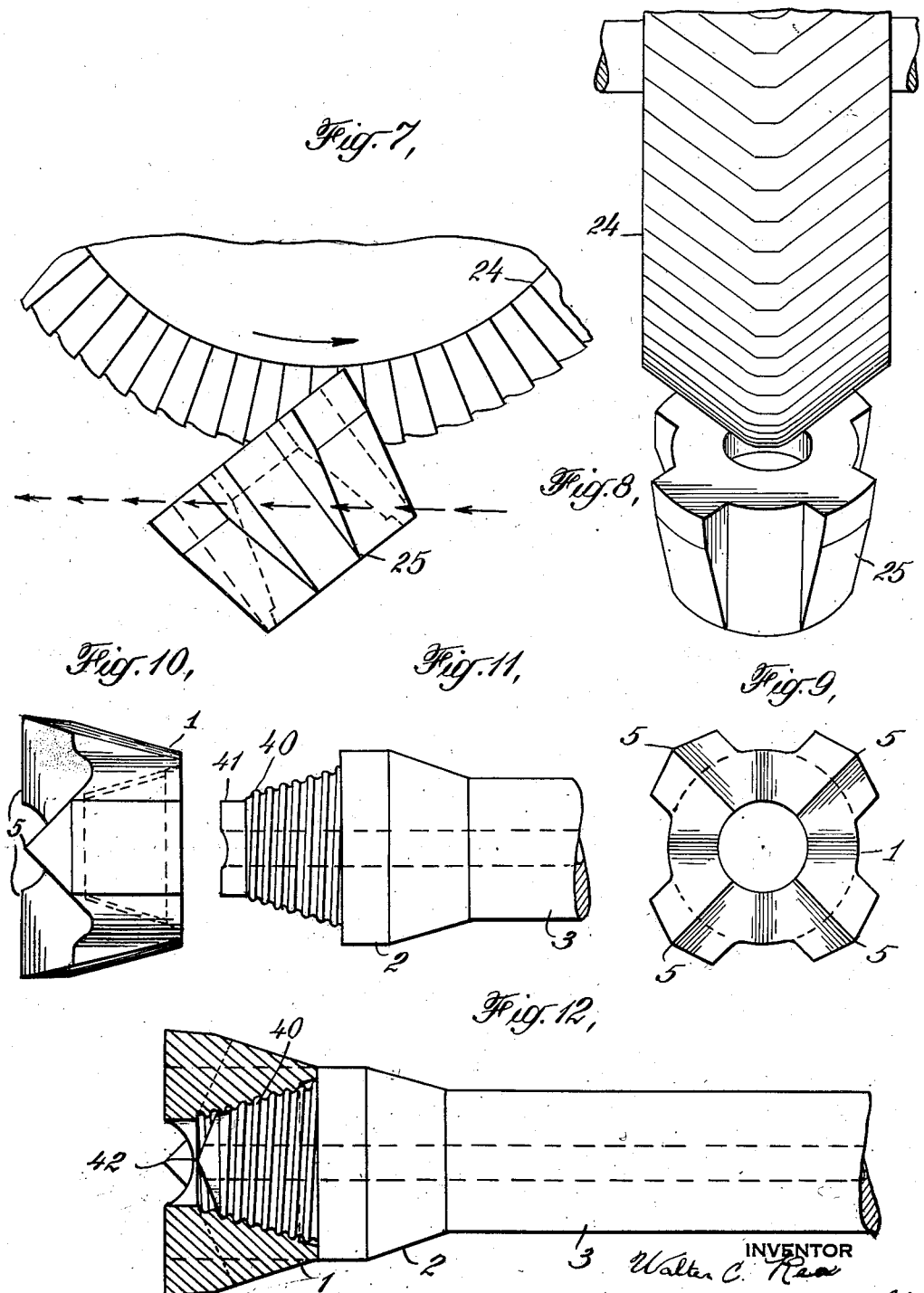

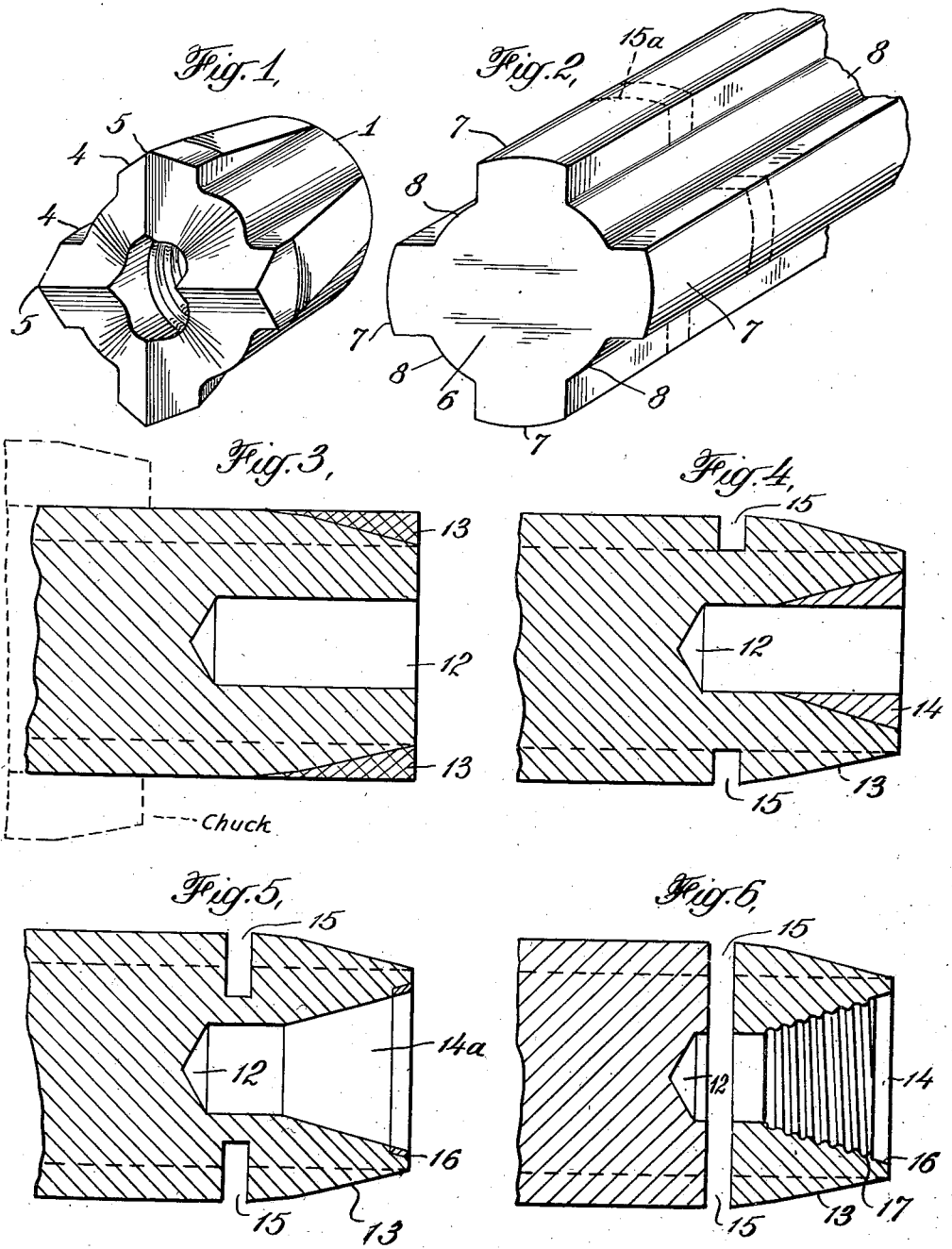

Oct. 6, 1942.  W. C. REA  2,297,983
METHOD OF MAKING DETACHABLE BITS FOR ROCK DRILLS
Filed March 9, 1939  4 Sheets-Sheet 3

INVENTOR
Walter C. Rea
BY
Pennie Davis Marvin & Edmonds
His ATTORNEYS

Oct. 6, 1942.  W. C. REA  2,297,983
METHOD OF MAKING DETACHABLE BITS FOR ROCK DRILLS
Filed March 9, 1939   4 Sheets-Sheet 4
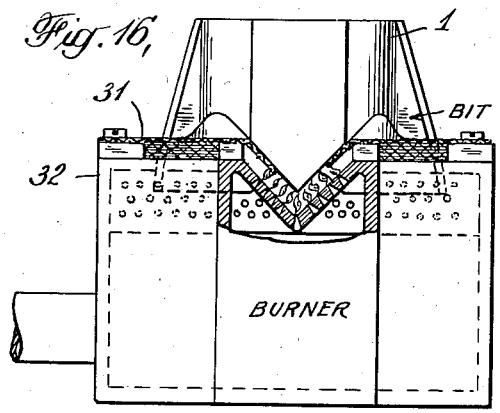
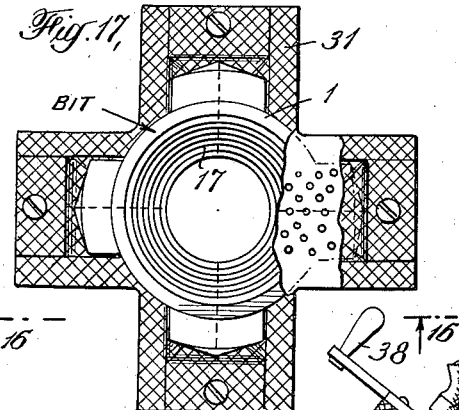
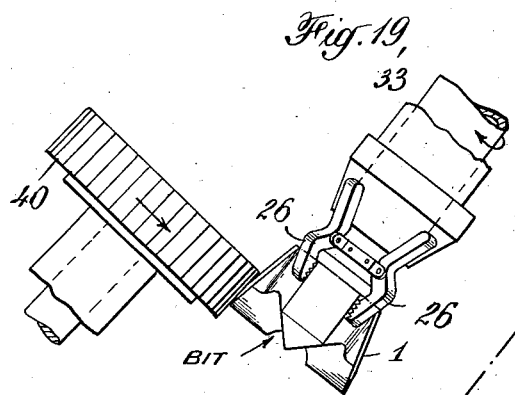
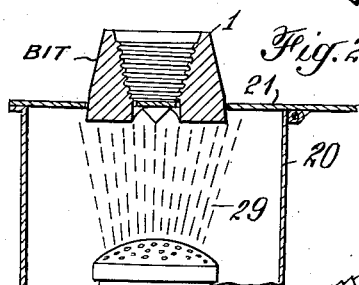
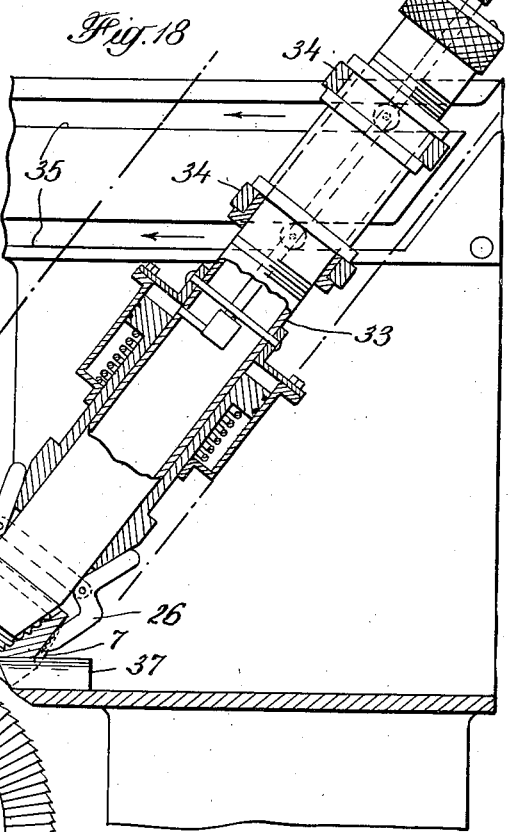
INVENTOR
Walter C. Rea
BY
Pennie Davis Marvin & Edmonds
his ATTORNEYS Patented Oct. 6, 1942

2,297,983

UNITED STATES PATENT OFFICE 2,297,983

METHOD OF MAKING DETACHABLE BITS FOR ROCK DRILLS

Walter C. Rea, Kew Gardens, N. Y., assignor to Detachable Bit Company, New York, N. Y., a corporation of Delaware Application March 9, 1939, Serial No. 260,715

2 Claims. (Cl. 148—4)

This invention relates to improvements in methods of manufacturing detachable rock drill bits and to the novel and improved bits produced by such process.

Detachable bit rock drills have in the last seven or eight years in large measure replaced the old type of drill bit produced by re-forging and sharpening the end of a piece of drill steel of the desired length. Percussively driven pneumatic rock drills are universally employed in mining, quarrying, excavating, tunneling and the like, wherever rock or ore is to be excavated, and until the advent of the detachable bit of the character hereinafter described it was the universal custom to use for this purpose lengths of hollow drill steel of round or hexagonal shape, having one end shaped and tempered to form a cutting edge. About eight or ten years ago a detachable bit rock drill made its appearance, the bit consisting primarily of a short cylindrical section of tool steel having a cutting edge formed on one end by a forging and tempering process similar to that previously employed in sharpening the end of the drill steel itself, and with the other end formed of an internally threaded sleeve to be screwed onto a corresponding thread formed on the end of the drill rod.

Considerable difficulty has always been experienced in the manufacture of these detachable bits particularly in the forging operation and the formation of the thread. These difficulties have manifested themselves in forging cracks and surface decarburization, and also in lack of uniformity in the shape of the bits and thread. Notwithstanding these defects, no better method of manufacturing of the bits has previously been devised, and the 50,000 bits which it is estimated at the time this application is filed is the daily production in this country, are all manufactured by a forging process.

The invention of the present application is a method of manufacturing such bits wherein bits are machined by automatic metal working machinery from bar steel of the proper shape and composition without heating and forging the bit in the manner heretofore employed.

My improved method of manufacture lessens the cost and increases the speed of manufacture. It also produces bits of absolutely uniform size and shape which may be readily sharpened to produce cutting edges of uniform hardness without weakening the balance of the bit or rendering it liable to breakage. The bits produced by my improved method of manufacture are not only more uniform in size and shape and without stresses or forging strains, but have better cutting edges, are more readily re-sharpened, and have a more accurate thread which permits their re-use a greater number of times than is possible with bits made by the old method of forging.

In the accompanying drawings I have illustrated my improved bit and the successive steps in its manufacture from the original rod.

In said drawings:

Fig. 1 shows the completed bit in perspective;

Fig. 2 shows in perspective a length of the rolled bar from which the bits are made;

Figs. 3-6 show the successive steps in the manufacturing operation performed on the end of the rod shown in Fig. 2 before it is cut off to bit length;

Fig. 7 illustrates the method of cutting away the end face of the bit to form the cutting edges;

Fig. 8 shows this step in perspective;

Fig. 9 shows the completed cutting face of the bit;

Figs. 10-12 show a finished bit, the end of a drill rod, and the method of attaching bit and rod for use;

Figs. 16-20 show the apparatus and method of resharpening bits made by this method.

Figure 13:
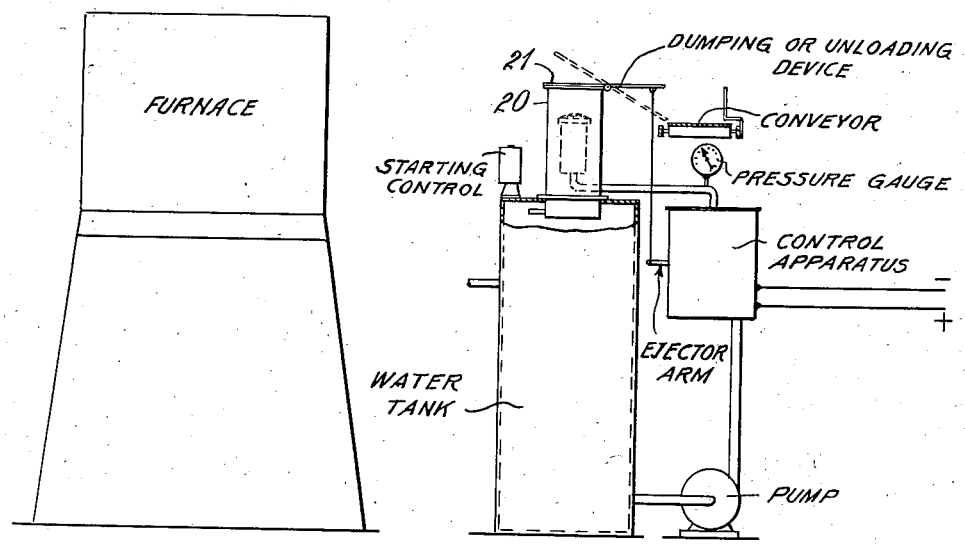
Figs. 13-15 show the apparatus and method of heat treatment used in the manufacture of the bits.

Referring to the drawings, Fig. 1 shows the finished bit which, as described above, comprises a threaded sleeve-like portion 1 whereby the bit is attached to the threaded end of the drill rod as shown in Figs. 10-12. The sleeve 1 is tapered slightly on the outside to conform with the shape of the expanded end 2 of the drill rod 3 and is also preferably tapered inside to give a quick release to the thread. These features are, however, not essential. The sleeve may be of uniform outside diameter through its length and the threaded socket may likewise be of uniform diameter. Beyond the threaded sleeve portion 1 the diameter of the bit is enlarged on two diameters intersecting at right angles, which enlarged portions 4 are shaped to form the cutting edges 5 of the popular cross form, which is the most widely used type of bit. Other types of cutting edges may be provided by selecting bars of different shapes, for example, the so-called chisel-edge bits and rose bits may be made by the process of this application, as hereinafter described, with slight modifications.

The bar 6 from which the bits are made is preferably rolled steel shaped for making cross-formed bits as shown in Fig. 2. In this shape the bar may be considered as a rod of uniform circular cross-section equal to the maximum diameter of the cutting edges 5, there being four portions of maximum diameter 7 and four alternating portions of smaller diameter indicated at 8. The portions of larger diameter 7 are in effect ribs with their sides parallel to the diametric planes passing through the median lines of the opposite ribs. Although the bars 6 are preferably hot-rolled to the shapes shown, they may be made from round rods by machining away the intermediate portions 8 between the ribs 7.

In the manufacture of the bits from bar 6 a length of stock is mounted in the chuck of a machine tool with the end of the rod protruding beyond the face of the chuck to somewhat greater extent than the length of the bit. As indicated in Fig. 3, two operations may be simultaneously performed upon the protruding end of the bar. These operations are the drilling of a small hole 12 in the center of the end of the rod to a depth greater than the length of the bit; and the machining down of the outside of the rod to the shape and diameter desired for the sleeve 1 of the finished bit as indicated at 13 wherein the cross-hatched area indicates the metal removed from the portions of the stock of greatest diameter, that is, the rib portions, leaving the intermediate portions of smaller diameter untouched. After these two operations are performed, the exposed end of the stock is drilled or reamed to remove the metal shown cross-hatched at 14 in Fig. 4 to form a tapered socket 14a (Fig. 5).

After the conical hole 14a is drilled to the desired depth for the thread, the tapered base of the hole is cut out as indicated in Fig. 5 at 16 and before the operation of cutting off the end of the rod is completed the thread 17 is cut in the inner wall of the sleeve formed by the drilling of the large hole 14a and the machining down of the outer diameter of the bit as above described. The cutting-off operation will then be completed and the remaining operations of the manufacture of the bit are performed on the separate bits.

The cutting operations may be performed by a saw or preferably by a narrow lathe tool which removes the portion of the rod indicated at 15. The cutting operation may also be carried out during the drilling and machining operations. It is so timed that enough metal will be left until the conclusion of the operations to support the end of the rod and transmit rotation thereto.

The entire cutting operation may be so accomplished but it has been found in practice that the cutting-off operation is facilitated and a better product obtained if the rib portions 7 of the bar 6 are cut as indicated in dotted lines at 15a in Fig. 2, by suitably spaced gang saws for the whole length of the bar 6 before the commencement of the manufacturing operations hereinbefore explained. Thereafter the cutting is continued as hereinbefore explained by a narrow lathe tool operating through the saw kerf in the ribs on the circular portion of small diameter 8.

As will be noted, the small hole 12 extends beyond the cut 15 into the end of the rod which is to form the next bit, thereby serving as a centering hold for the succeeding drilling operation.

At this stage of the operation the bit is properly shaped, all except the cutting face which is now merely a flat surface transverse to the axis of the bar and of a configuration the same as the original stock. The unfinished bit 25 at this stage is shown in Figs. 7–8.

For shaping the cutting edge of the bit, I preferably use a tool of the type known as a gear cutter or broach. This tool comprises essentially a rotating shaft carrying a cutter of disk shape, but with the periphery of the disk which forms the cutting edge tapered on both sides from a middle plane of maximum diameter. I have not attempted to illustrate the details of this cutter as it is a well known machine tool, its chief use being to cut grooves of the shape of the periphery of the cutter in blocks, plates and the like.

In the drawings, Figs. 7 and 8, I have shown the cutter 24 in the position it reaches just at the completion of the first of the four grooves which are cut into the face of the unfinished bit 25, to form the cutting edges 5. As will be observed the end of the unfinished bit 25 is held against the cutter 24 at the desired angle with the result that four wedge-shaped teeth or cutting portions 5 as shown in Fig. 9, are formed on the face of the bit. The bit thus formed is identical in shape with the bits as heretofore made by forging. The bit, however, is of a tough, soft steel and must be heat-treated for the cutting edges to have sufficient hardness. If the cutting operation last described, that is, the operation performed with the gear cutter or broach, is carried out with sufficient care no grinding or further machining of the bits will be necessary, but, if desired, the cutting edges of the bits may be more accurately shaped by a grinder before hardening. A disk grinder having its periphery of the same shape as the gear cutter would preferably be employed for this purpose.

In order properly to harden the cutting edges the bits must be heat-treated and the hardening effect must be confined to the cutting face, otherwise the sleeve and thread will be rendered too brittle to withstand the terrific shock to which percussively-driven detachable bits are subjected. To this end I have devised a special method of heat-treating the bits which not only serves to harden the cutting face, but at the same time toughens the balance of the bit, thus imparting to the cutting edge the requisite hardness and at the same time increasing the shock-absorbing characteristics of the sleeve and thread.

Figure 14:
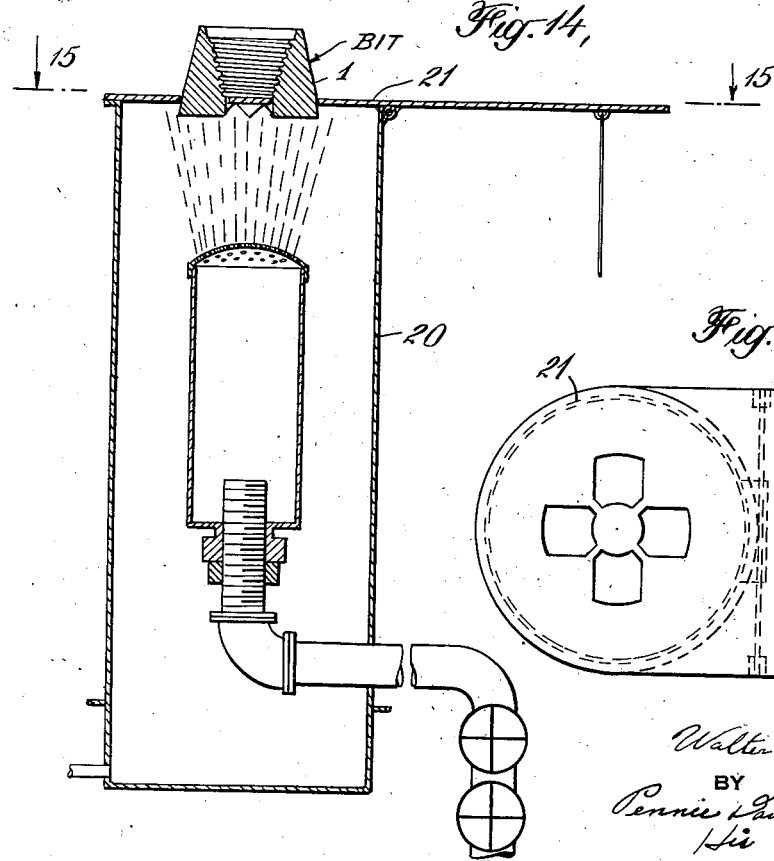
Figure 15:
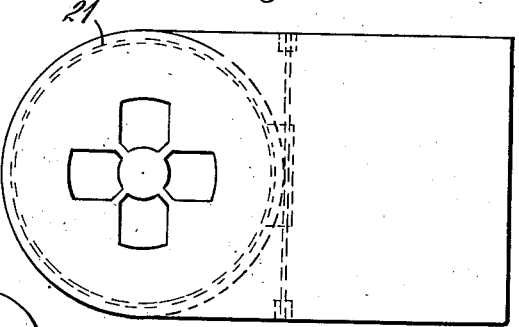

In carrying out this heat-treament, as shown in Figs. 13–15, the bit as a whole is heated in a furnace to the desired temperature, in the neighborhood of 1550 degrees F., and it is thereafter quenched on its cutting face by a jet of water under pressure directed at the face of the bit, the balance of the surface of the bit being shielded as shown in Figs. 14 and 15 in such a manner as to prevent any contact with the water. This surface quench is particularly advantageous for quantity production manufacturing for the reason that the quench takes place in a minimum time and by automatically regulating the pressure and temperature of the water, the size of the stream and the time of operation, identical effects will be produced. In the old methods of surface quenching, wherein the article having the surface to be hardened was dipped in a shallow pan of water, to an extent merely to submerge the surface to be hardened, the generation of steam at the surface slowed up the hardening process to a considerable extent and produced soft spots and irregularity in surface hardening due to the insulating effect of adhering steam bubbles. This generation of steam in a shallow pan introduces a variable quantity into the heat treatment which can only be obviated by careful observation of a skilled artisan who can tell when the desired effect is reached by the changing color of the surface. With the pressure jet, however, the steam formed at one instant is at once condensed by the oncoming water so that its effect is negligible, and the surface hardening uniform.

After the quench of the surface has been accomplished as hereinbefore described by automatically timed full pressure spray, the water is not cut off abruptly, but the volume of the spray is automatically reduced to a precalculated point at which it is just sufficient to maintain the quenched surface cool against the tendency of the yet hot body of the bit to reheat it. By carefully confining the quench to surface to be hardened, very little heat is absorbed from the metal of the bit beyond the cutting face, and consequently this portion of the bit cools slowly, thereby toughening the sleeve and metal at the base of the sleeve to a tough, fibrous, shock-absorbing condition which greatly improves its resistance to strains and breakage.

In Figs. 13, 14 and 15 I have illustrated a suitable apparatus for efficiently and economically carrying out the above described heat treatment. A quantity of bits is continuously maintained at the described temperature in the furnace. Adjacent the furnace so as to be in easy reach of the operator is a row of quenching devices such as the one illustrated. Each of these consists of a tubular support 20, having a hinged cover 21 having four holes, as shown in Fig. 15, shaped to admit the four cutting edges of the bit and shield the rest of the bit from the water spray enclosed in the tubular support.

The supports 21 are mounted along the top of water tank and each is equipped with its individual automatic control consisting of a pump, a motor for driving the pump, and a timed control for the pump, motor and for the bit discharge.

The operator takes the bits one at a time from the furnace and places them on the shields 21 over the sprays. After each bit is placed he presses the starting control button which starts the spray pump. The automatic control apparatus thereafter regulates the pressure and time of the spraying operation and at the conclusion of the treatment the ejector arm is tripped and the bit flipped over onto the discharge conveyor.

As the only operation performed by the workman is the placing of the bits on the supports and pressing the appropriate starting button, he can maintain a number of heat-treating units in operation so that the output of bits per man is much greater than with the old shallow pan method of tempering, and also, as stated above, the product is of uniformly good quality.

My improved method of heat treatment is also readily adaptable to the resharpening of used bits, and in Figs. 16–20 I have illustrated my improved method of re-shaping and re-sharpening used bits to restore them to the same accurate dimensions and the same uniform sharpness and hardness as new bits.

The bit to be re-sharpened is first heated in a gas burner such as illustrated in Figs. 16 and 17, the heat being localized to the surface to be re-sharpened. While any improved form of heater may be used, the gas burner shown in Figs. 16 and 17 has been found satisfactory. As shown, the face of this burner is shaped to conform to the cutting face of the bit and its surface partially covered with wire gauze 31 spaced from the face of the burner by a metal frame 32 which conforms with the outline of the burner. The cutting face of the bit which is thus supported immediately above the gas openings in the burner is heated to a temperature somewhat below the temperature at which the steel becomes non-magnetic. During the heating operation the body of the bit is shielded by the wire gauze 31 in the frame 32 from the burner flame so that it is heated only by conduction from the cutting face and is therefore not brought to the temperature which affects its temper. After the cutting face of the bit is heated to the desired temperature in the burner it is re-shaped by a hot milling operation which may be readily carried out by the apparatus shown in Fig. 18. This apparatus consists primarily of a rotary cutter and a rotatable chuck in which the bit is supported and moved in a properly directed path with respect to the cutter. The chuck comprises a spindle 33 mounted for rotation in supporting bearings 34, which bearings are in turn mounted to slide in tracks 35 in a fixed support. Each bearing is separately threaded on the spindle so that they may be adjusted toward and away from each other to accurately adjust the angle of the spindle with respect to the guide tracks and at the same time furnish an adjustment of the spindle toward and from the cutter. The spindle is provided at its lower end with chuck jaws 26 which fit into the grooves between the ribs 7 of the bit and hold it in place, the jaws being clamped against the bit by the conventional pneumatically operated sliding cone. The spindle is provided at its upper end with a handle 38 by which the spindle is readily rotated in the threaded bearing sleeves to move the spindle toward and from the cutter 36. The cutter 36 is of the same shape as the "gear" cutter 24 used in shaping the cutting edge of the bit in its original manufacture.

In operation the bit is clamped in the chuck jaws on the end of the spindle and the spindle then moved toward the cutter by means of the handle 38 until the bit engages a gauge stop 37 fixedly mounted adjacent the cutter wheel 36. The chuck is now shifted materially in its guide tracks across the face of the cutter 36, thereby re-machining the cutting face of the bit to restore it to its original shape.

The spindle 31 will be turned a quarter turn between each cutting operation so as to re-shape all four cutting edges of the bit. After this operation the circumferential faces of the four cutters will be machined off to accurately re-size the bit. This operation is shown in Fig. 19 as performed by a spur type milling cutter 40 which in practice will be supported in position beyond the cutter 36 so that after the last operation of the cutter the bit may be brought into position for engagement with the spur tooth cutter without removing it from the chuck. At the completion of the re-shaping the bit will be at the correct temperature to be properly hardened in a cold water spray such as illustrated in Fig. 20, and which may be identical with the spray 20 employed in the original treatment of the bits.

Between the final machining operation illustrated in Fig. 19 and the quenching operations for hardening the cutting surface, the bit may of course be reheated or cooled to bring the surface to a definite temperature before quenching. This is not ordinarily necessary, as the milling operations are routine operations producing substantially the same temperature change for each bit.

My improved bit is provided with a tapered thread for use on drill rods having a similarly shaped thread, as illustrated in Figs. 11 and 12, but it will of course be understood that the same method of manufacture may be employed in manufacturing bits with the more common cylindrical thread. The tapered thread has the advantage that the bit may be screwed on and off the rod with fewer turns and hence more quickly. It also has the advantage of providing a greater amount of metal at the base of the threaded sleeve where it joins the cutting end. In the operation of the bits this is the region of greatest shock and the greater thickness of the metal at this point materially reduces the breakage.

In Figs. 11 and 12 I have illustrated a novel design of drill rod which is particularly useful with bits of the design shown. As here shown, the tapered end 40 of the drill rod is not threaded throughout its length, but is provided at its smaller end with a cylindrical extension 41 which is machined on its face to provide a cutting edge 42 as shown more particularly in Fig. 12. This construction is particularly desirable with bits having large center holes. With such bits there is apt to be left in the center of the hole being drilled an upstanding core which, unless broken down as the drilling progresses, will interfere with the force of the cutting edges against the rock at the bottom of the hole. With the edge 42 on the end of the drill rod this center core is broken away as soon as it reaches a height to be struck by the chisel point on the end of the rod, so that the core will not interfere with the proper operation of the drill.

I claim:

1. The method of making detachable bits for rock drills which consists in machining the bits to proper shape from rolled bar stock and thereafter heat-treating the machined bits, said heat treatment consisting of the following steps: heating the bits, supporting the bits to expose the cutting face only to a quenching spray while protecting the balance of the bit from water contact, regulating the force, time and temperature of the spray to effect a hardening of the cutting surface only and then slowly cooling the bits.

2. The method of refinishing detachable bits for rock drills which consists in heating the cutting face of the bit, machining the face of the bit while hot to provide a new cutting face and thereafter hardening the cutting face by a quenching spray projected against the hot cutting face of the bit, the bit during the heating and quenching operations being protected to prevent changes in temperature in the body of the bit of a character to adversely affect its shock-absorbing characteristics.

WALTER C. REA.